United States Patent [19]

Kamo et al.

[11] Patent Number: 5,162,281
[45] Date of Patent: Nov. 10, 1992

[54] METHOD OF PREPARING HYDROTREATING CATALYST FOR HYDROCARBON OIL

[75] Inventors: Tetsuro Kamo; Yuuki Kanai, both of Ichikawa, Japan

[73] Assignee: Sumitomo Metal Mining Co. Ltd., Tokyo, Japan

[21] Appl. No.: 822,081

[22] Filed: Jan. 17, 1992

[30] Foreign Application Priority Data

Jan. 22, 1991 [JP] Japan .................. 3-21516

[51] Int. Cl.$^5$ ............... B01J 37/20; B01J 37/28; B01J 27/049
[52] U.S. Cl. .................... 502/168; 502/170; 502/210; 502/211; 502/213; 502/219; 502/220; 502/222; 502/254
[58] Field of Search .......... 502/168, 170, 210, 211, 502/213, 219, 220, 222, 254; 208/216 R, 217

[56] References Cited

U.S. PATENT DOCUMENTS 4,992,403  2/1991  Takahashi et al. .......... 502/168
4,997,801  3/1991  Mitarai et al. .......... 502/168

FOREIGN PATENT DOCUMENTS 5692  1/1977  Japan .......... 502/170

*Primary Examiner*—Carl F. Dees
*Attorney, Agent, or Firm*—Watson, Cole, Grindle & Watson

[57] ABSTRACT

Disclosed is a method of preparing a high-activity hydrotreating catalyst for hydrocarbon oil, where metals of Group VI (Mo and/or W) and Group VIII (Co and/or Ni) optionally along with phosphorus, and 0.3 to 3.5 molar times of the total molar amount of the metals of particular carboxylic acid(s) (tartaric acid, citric acid, etc.) and 0.1 times or more of the amount necessary for forming the active metals into their sulfides of particular organic sulfur compound(s) (mercapto-acetic acid, mercapto-succinic acid, etc.) are added to a material consisting essentially of at least one of inorganic acids and their hydrates, and they are kneaded shaped and dried at 200° C. or lower. Using the catalyst, hydrotreatment, desulfurization and denitrogenation of hydrocarbon oil may be effected under mild conditions at a reduced operation cost.

9 Claims, No Drawings

METHOD OF PREPARING HYDROTREATING CATALYST FOR HYDROCARBON OIL

FIELD OF THE INVENTION

The present invention relates to a method of preparing a high-activity hydrotreating catalyst for hydrocarbon oil, especially such that meets the requirement of reducing the sulfur content in a light oil.

BACKGROUND OF THE INVENTION

As a catalyst to be used for hydrotreating hydrocarbon oil, for example, for hydrogenation, desulfurization, denitrogenation and decomposition of the same, a hydrotreating catalyst composed of a porous catalyst material such as alumina, silica, titania or active charcoal and active metals of a metal of the Group VI of the Periodic Table such as molybdenum or tungsten and a metal of the Group VIII of the same such as cobalt or nickel as supported on the material is used. The active metals are supported on the catalyst material in the form of their oxides which are not active. Therefore, suitable pre-sulfurization is applied to the catalyst so as to convert the oxides into the corresponding sulfides before use.

However, it is known that, in a hydrotreating catalyst, since the active sites of the catalyst are formed on the surfaces of the active metal oxides therein, the number of the active sites increases with enlargement of the exposed surface area of the active metal sulfides to give, as a result, a high-activity catalyst. For the purpose of enlarging the exposed surface area of the active metal sulfides in the catalyst, formation of a fine powder of active metal sulfides to give a fine dispersion of them has been attempted and various methods for the purpose have heretofore been proposed. For instance, EP0181035(A2) has disclosed a method of preparing a hydrotreating catalyst in which a mixed liquid comprising a nitrogen-containing organic compound such as nitrilotriacetic acid, ethylenedimainetetraacetic acid or diethylenetriamine and active metals is infiltrated into a material such as alumina or silica and finally the resulting material is dried at a temperature of 200° C. or lower. In accordance with the method, complexing ions are formed between the active metal and the nitrogen-containing organic compound and the resulting complexes are supported on the material so as to prevent coagulation of the active metals and to attain high dispersion of them. As a result, the catalyst obtained by the method have a higher active value than conventional catalysts. Recently, however, a requirement of reducing the sulfur content in a light oil due to legal controls on the exhaust gas has been submitted (the report of making the sulfur content in a light oil to be 0.05% by weight or less, as submitted to the related government authorities). In order to attain the object as intended by the requirement, the catalyst as prepared by the method was found to be still unsatisfactory.

The present applicant already proposed a method of preparing a hydrotreating catalyst in which an aqueous solution of a mixture of a hydroxycarboxylic acid such as glycolic acid, tartaric acid, citric acid or gluconic acid and active metals is applied to a catalyst material by dipping or kneading and thereafter the resulting material is dried at a temperature of 200° C. or lower. In accordance with the method, since a hydroxycarboxylic acid is used as a complexing agent and the catalyst is not finally fired but is merely dried at a temperature of 200° C. or lower, the hydroxycarboxylic acid is not decomposed but is stably held on the catalyst material and the active metal ions are complexed with the stable hydroxycarboxylic acid so that the thermal coagulation of the active metal sulfides to often occur after presulfurization of the catalyst may noticeably be inhibited. As a result, the active metal sulfides may well be supported on the material in the form of a high dispersion. According to the method, therefore, a hydrotreating catalyst having a higher activity than other conventional hydrotreating catalysts to which a nitrogen containing organic compound has been added can be obtained characteristically.

Where high-level desulfurization, or so-called deep desulfurization, of hydrocarbon oil is attained by the use of a conventional hydrotreating catalyst, a much more severe operation condition for hydrotreatment than an ordinary operation condition for the same is needed. As a result, the catalyst used is easily deteriorated and the catalyst life is shortened so that the operation cost is naturally elevated. On the other hand, where the abovementioned catalyst as obtained with a hydroxycarboxylic acid is used in deep desulfurization of hydrocarbon oil, the hydrotreating operation may well be carried out under the conventional operation condition so that the current operation cost level may be maintained in the case. However, it is desired to effect the hydrotreating operation at a lower cost for the purpose of making provision for unforeseen elevation of the cost of crude oil. Under the situation, if a hydrotreating catalyst having a higher activity could be developed, deep sulfurization of hydrocarbon oil could be carried out under a milder condition than the status quo. Therefore, it is an urgent necessity for those skilled in the art to develop such a high activity catalyst.

SUMMARY OF THE INVENTION

The object of the present invention is to provide a method of preparing a hydrotreating catalyst for hydrocarbon oil, which catalyst has a catalyst activity extremely higher than that of the above-mentioned hydroxycarboxylic acid-added hydrotreating catalyst and is possible to reduce the hydrotreating operation cost with it.

The present inventors earnestly studied for the purpose of overcoming the above-mentioned problems in the prior art and of attaining the above-mentioned object of the present invention and, as a result, have found that the object of the invention can be attained by a method of using at least one of inorganic oxides and their hydrates as a catalyst material and adding thereto active metals optionally along with phosphorus, a determined amount of particular carboxylic acid(s) and a determined amount of particular organic sulfur compound(s), followed by kneading and shaping the resulting blend, and thereafter drying the shaped pellets at a temperature of 200° C. or lower. On the basis of the finding, they have achieved the present invention.

Specifically, there is provided in accordance with the first aspect of the present invention a method of preparing a hydrotreating catalyst for .hydrocarbon oil, in which metals of the Group VI and the Group VIII of the Periodic Table, from 0.3 to 3.5 molar times, of the total molar amount of the metals of the Group VI and the Group VIII of the Periodic Table, of at least one carboxylic acid selected from the group consisting of glycolic acid, lactic acid, tartaric acid, malic acid, citric acid, glyceric acid, gluconic acid, methoxy-acetic acid, ethoxy-acetic acid, malonic acid, succinic acid and glyoxylic, and 0.1 times or more, of the amount necessary for making the metals of the Group VI and the Group VIII of the Periodic Table to their sulfides, of at least one organic sulfur compound selected from the group consisting of mercapto-acetic acid, 1-mercapto-propionic acid, 2-mercapto-propionic acid, 2,3-dimercapto-succinic acid, mercapto-succinic acid, thio-acetic acid, thio diglycolic acid, dithio-diglycolic acid, thiosalicylic acid, mercaptoethanol, β-thiodiglycol and thiourea are added to a material substance consisting essentially of at least one of inorganic oxides and their hydrates, and they are kneaded, shaped and then dried at a temperature of 200° C. or lower.

There is also provided in accordance with the second aspect of the present invention a method of preparing a hydrotreating catalyst for hydrocarbon oil, in which metals of the Group VI and the Group VIII of the Periodic Table and additionally from 0.1 to 8 % by weight, as $P_2O_5$, of phosphorus are added to a material substance consisting essentially of at least one of inorganic oxides and their hydrates, along with the determined amount of the same carboxylic acid(s) and the determined amount of the same organic sulfur compound(s) as those in the first aspect, and they are kneaded, shaped and dried at a temperature of 200° C. or lower.

DETAILED DESCRIPTION OF THE INVENTION

The catalyst material substance for use in the present invention is composed of at least one of inorganic oxides, such as alumina, silica, titania and zirconia, and their hydrates.

As the metals of the Group VI of the Periodic Table for use in the present invention, at least one of molybdenum and tungsten is used; and as the metals of the Group VIII of the same at least one of cobalt and nickel is used. The amount of these metals to be added may be such that is generally used in preparing an ordinary hydrotreating catalyst. For instance, the amount of the metal(s) of the Group VI to be added is preferably from 5 to 30% by weight as $MoO_3$ and/or $WO_3$; and that of the metal(s) of the Group VIII to be added is from 1 to 8% by weight as CoO and/or NiO. If the amounts of the metals are less than the defined ranges, a high-activity catalyst could not be obtained. If, on the other hand, the amounts are more than the same, the pores of the materials would be clogged with the active metals so that internal diffusion of the hydrocarbon oil as applied to the hydrotreating catalyst would be impaired and the activity of the catalyst would be low.

As phosphorus, any form of metaphosphoric acid, pyrophosphoric acid and orthophosphoric acid may be used. As the case may be, a soluble salt such as nickel phosphate may also be used. The amount of the phosphorus to be in the catalyst is from 0.1 to 8 % by weight as $P_2O_5$. By incorporating phosphorus of the amount as defined above into the catalyst, the phosphorus acts as a stabilizer when the active metals are infiltrated into the catalyst material whereby the activity of the catalyst is elevated further more.

As carboxylic acids, at least one is selected from glycolic acid, lactic acid, tartaric acid, malic acid, citric acid, glyceric acid, gluconic acid, methoxy-acetic acid, ethoxyacetic acid, malonic acid, succinic acid and glyoxylic acid and is added to the metals of the Group VI and the Group VIII of the Periodic Table optionally along with phosphorus. The amount of the acid(s) to be added is from 0.3 to 3.5 molar times of the total molar amount of the metals of the Group VI and the Group VIII of the Periodic Table. If the amount is less than 0.3 molar times, the catalyst formed could not have a sufficient activity. If, on the contrary, it is more than 3.5 molar times, carbonaceous materials would remain or precipitate in the catalyst after pre-sulfurization to interfere with sulfurization of the active metals. Anyhow, addition of too large amount or too little amount of such carboxylic acid(s) overstepping the defined range is unfavorable as they would lower the activity of the catalyst.

As organic sulfur compounds, at least one is selected from mercapto-acetic acid, 1-mercapto-propionic acid, 2-mercaptopropionic acid, 2,3-dimercapto-succinic acid, mercaptosuccinic acid, thio-acetic acid, thio-diglycolic acid, dithio-diglycolic acid, thio-salicylic acid, mercaptoethanol, β-thiodiglycol and thiourea and is added to the metals of the Group VI and the Group VIII of the Periodic Table along with the above-mentioned carboxylic acid(s) and optionally along with phosphorus. The amount of the compound(s) is 0.1 times or more of the amount necessary for converting the metals of the Group VI and the Group VIII of the Periodic Table into their sulfides, and it is sufficiently from 0.1 to 0.5 times of the same. If the compound(s) is/are added in an amount more than the defined range, the catalyst activity would no more be elevated further. In consideration of the manufacture cost, the amount of the organic sulfur compound(s) to be added is preferably as small as possible within the allowed range.

These components are kneaded, shaped and then dried. The drying temperature is 200° C. or lower. If it is higher than 200° C., the carboxylic acid(s) and organic sulfur compound(s) as added would be decomposed.

The catalyst of the present invention, which has been prepared under the condition of satisfying the above-mentioned elements, is in such a form where the active metal ions of molybdenum, tungsten, cobalt and/or nickel are complexed with the above-mentioned carboxylic acid(s) to form coordinate compounds and the coordinate compounds are stably held on the catalyst material. By addition of a small amount of the above-mentioned organic sulfur compound(s) to the catalyst, the catalyst activity is further more elevated. Though not clarified, this is because of the following reasons. Where only carboxylic acid(s) is/are added to the catalyst, the added carboxylic acid(s) would be stored in the pores of the catalyst material so that the pores would be clogged with the stored acid(s) and therefore the active metals in the inside of the pores could hardly be sulfurized in the pre-sulfurization. This would have an influence on the hydrotreating activity of the catalyst. However, by addition of a small amount of organic sulfur compound(s) to the catalyst of such a condition, sulfurization of the active metals would be accelerated so that the resulting catalyst may have an elevated high activity.

Next, the present invention will be explained in more detail by way of the following examples, which, however, are not intended to restrict the scope of the present invention.

EXAMPLE 1

400 ml of an aqueous solution of active metals, as prepared from 119 g of molybdenum trioxide, 34.6 g of cobalt carbonate, 229 g of glycolic acid, 23 g of mercaptoethanol and water, was added to 1000 g of alumina hydrate (water content: 60 % by weight) and kneaded under heat at 80° C. The resulting blend was then shaped into cylindrical pellets each having a diameter of 1.6 mm through an extruder. The shaped cylindrical pellets were then dried at 100° C. for 16 hours to obtain catalyst A.

Regarding the metal content in the catalyst A, the content of molybdenum was 22 % by weight as $MoO_3$, and that of cobalt was 4% by weight as CoO. The amount of the glycolic acid added was 2.6 molar times of the total molar amount of the metals of the Group VI and the Group VIII of the Periodic Table; and the amount of the mercaptoethanol added was 0.15 times of the amount necessary for converting molybdenum and cobalt to $MoS_2$ and CoS, respectively. As the activity test of the catalyst A thus prepared, hydrotreatment and desulfurization of Kuwait normal pressure light oil was effected with it. The oil used for the treatment had the following properties.

| Specific Gravity | 0.844 |
| --- | --- |
| Sulfur Content (% by weight) | 1.55 |
| Distillation Characteristics | |
| Initial boiling point (°C.) | 231 |
| 50 vol % boiling point (°C.) | 313 |
| End point (°C.) | 390 |

The hydrotreating reaction was effected in a flow method system reactor, under the following reaction conditions.

| Catalyst Amount (ml) | 15 |
| --- | --- |
| Crude Oil Liquid Space Velocity ($hr^{-1}$) | 2 |
| Reaction Hydrogen Pressure ($kg/cm^2G$) | 30 |
| Reaction Temperature (°C.) | 330 |
| Ratio of Hydrogen/Oil Flow (Nl/l) | 300 |
| Oil Flowing Time (hr) | 88 |

A rate constant was calculated under the condition that the desulfurization rate is considered to be proportional to the 1.75th power of the sulfur concentration of the raw material normal pressure light oil. A relative rate constant was obtained on the basis of the rate constant of catalyst K of Referential Example 1 to follow hereunder of being 100. From the relative rate constant thus obtained, the hydrotreatment and desulfurization activity of the catalyst was obtained. The result is shown in Table 1 below.

EXAMPLE 2

400 ml of an aqueous solution of active metals, as prepared from 124 g of molybdenum trioxide, 36 g of cobalt carbonate, 27 g of 85% phosphoric acid, 85 g of citric acid, 78 g of β-thiodiglyco and water, was added to 1000 g of the above-mentioned alumina hydrate, and kneaded under heat at 80° C. The resulting blend was then shaped into cylindrical pellets each having a diameter of 1.6 mm through an extruder. The shaped pellets were dried at 100° C. for 16 hours to obtain catalyst B. Regarding the metal content in the catalyst B, the content of molybdenum was 22% by weight as $MoO_3$, that of cobalt was 4% by weight as CoO, and that of phosphorus was 3 by weight as $P_2O_5$. The amount of the citric acid added was 0.35 molar times of the total molar amount of the metals of the Group VI and the Group VIII of the Periodic Table; and the amount of the β-thiodiblycol added was 0.3 times of the amount necessary for converting molybdenum and cobalt to MoS2 and CoS, respectively. Catalyst B thus obtained was subjected to the same activity test as that in Example 1, and the result obtained is shown in Table 1 below.

EXAMPLE 3

The same process as in Example 2 was repeated except that the amount of the citric acid added was changed to 170 g, to obtain catalyst B. Regarding the metal content in the catalyst C, the content of molybdenum was 22% by weight as $MoO_3$, that of cobalt was 4% by weight as CoO, and that of phosphorus was 3% by weight as $P_2O_5$. The amount of the citric acid added was 0.7 molar times of the total molar amount of the metals of the Group VI and the Group VIII of the Periodic Table; and the amount of the β-thiodiglycol added was 0.3 times of the amount necessary for converting molybdenum and cobalt to MoS2 and CoS, respectively. Catalyst C thus obtained was subjected to the same activity test as that in Example 1, and the result obtained is shown in Table below.

EXAMPLE 4

The same process as in Example 2 was repeated except that 213 g of tartaric acid was used as a carboxylic acid and 66 g of mercapto acetic acid was used as an organic sulfur compound, and catalyst D was obtained. Regarding the metal content in the catalyst D, the content of molybdenum was 22% by weight as $MoO_3$, that of cobalt was 4% by weight as CoO, and that of phosphorus was 3% by weight as $P_2O_5$. The amount of the tartaric acid added was 1.3 molar times of the total molar amount of the metals of the Group VI and the Group VIII of the Periodic Table; and the amount of the mercapto-acetic acid added was 0.3 times of the amount necessary for converting molybdenum and cobalt to $MoS_2$ and CoS, respectively. Catalyst D thus obtained was subjected to the same activity test as that in Example 1, and the result obtained is shown in Table 1 below.

EXAMPLE 5

The same process as in Example 2 was repeated except that 400 ml of an aqueous solution of active metals as prepared from 136 g of molybdenum trioxide, 40 g of nickel carbonate, 30 g of 85% phosphoric acid, 302 g of methoxy-acetic acid, 130 g of β-thiodiglycol and water was added to 1000 g of silica-alumina hydrate ($SiO_2$ content 10% by weight; water content 56% by weight), and catalyst E was obtained. Regarding the metal content in the catalyst E, the content of molybdenum was 22% by weight as $MoO_3$, that of nickel was 4% by weight as NiO, and that of phosphorus was 3% by weight as $P_2O_5$. The amount of the methoxy-acetic acid added was 2.6 molar times of the total molar amount of the metals of the Group VI and the Group VIII of the Periodic Table; and the amount of the β-thiodiglycol added was 0.5 times of the amount necessary for converting molybdenum and nickel to $MoS_2$ and NiS, respectively. Catalyst E thus obtained was subjected to the same activity test as that in Example 1, and the result obtained is shown in Table 1 below.

EXAMPLE 6

The same process as in Example 2 was repeated except that 400 ml of an aqueous solution of active metals as prepared from 124 g of molybdenum trioxide, 36 g of nickel carbonate, 27 g of 85% phosphoric acid, 163 g of malonic acid, 94 g of thio-diglycolic acid and water was added to 1000 g of the above-mentioned alumina hydrate, and catalyst F was obtained. Regarding the metal content in the catalyst F, the content of molybdenum was 22% by weight as $MoO_3$, that of nickel was 4% by weight as NiO, and that of phosphorus was 3% by weight as $P_2O_5$. The amount of the malonic acid added was 1.3 molar times of the total molar amount of the metals of the Group VI and the Group VIII of the Periodic Table; and the amount of the thio-diglycolic acid added was 0.3 times of the amount necessary for converting molybdenum and nickel to $MoS_2$ and NiS, respectively. Catalyst F thus obtained was subjected to the same activity test as that in Example 1, and the result obtained is shown in Table 1 below.

EXAMPLE 7

The same process as in Example 2 was repeated except that 400 ml of an aqueous solution of active metals as prepared from 124 g of molybdenum trioxide, 36 g of cobalt carbonate, 27 g of 85% phosphoric acid, 288 g of glyoxylic acid, 75 g of 2,3 dimercapto succinic acid and water was added to 6.67 kg of titania sol (product by Taki Chemical Co.; water content 94% by weight), and catalyst G was obtained. Regarding the metal content in the catalyst G, the content of molybdenum was 22% by weight as $MoO_3$, that of cobalt was 4% by weight as CoO, and that of phosphorus was 3% by weight as $P_2O_5$. The amount of the glyoxylic acid added was 2.6 molar times of the total molar amount of the metals of the Group VI and the Group VIII of the Periodic Table; and the amount of the 2,3-dimercaptosuccinic acid added was 0.2 times of the amount necessary for converting molybdenum and cobalt to $MoS_2$ and CoS, respectively. Catalyst G thus obtained was subjected to the same activity test as that in Example 1, and the result obtained is shown in Table 1 below.

EXAMPLE 8

The same process as in Example 2 was repeated except that 4000 g of titania sol (product by Ishihara Sangyo KK, water content 90% by weight) was used as a catalyst material, 319 g of gluconic acid (as 50wt. % aqueous solution) was as a carboxylic acid and 47 g of thio-acetic acid was as an organic sulfur compound, and catalyst H was obtained. Regarding the metal content in the catalyst H, the content of molybdenum was 22% by weight as $MoO_3$, that of cobalt was 4% by weight as CoO, and that of phosphorus was 3% by weight as $P_2O_5$. The amount of the gluconic acid added was 0.7 molar times of the total molar amount of the metals of the Group VI and the Group VIII of the Periodic Table; and the amount of the thio-acetic acid added was 0.3 times of the amount necessary for converting molybdenum and cobalt to $MoS_2$ and CoS, respectively. Catalyst H thus obtained was subjected to the same activity test as that in Example 1, and the result obtained is show in Table 1 below.

EXAMPLE 9

The same process as in Example 2 was repeated except that 202.5 g of malic acid was used as a carboxylic acid and 66.4 g of 1-mercapto-propionic acid was as an organic sulfur compound, and catalyst I was obtained. Regarding the metal content in the catalyst I, the content of molybdenum was 22% by weight as $MoO_3$, that of cobalt was 4% by weight as CoO, and that of phosphorus was 3% by weight as $P_2O_5$. The amount of the malic acid added was 1.3 molar times of the total molar amount of the metals of the Group VI and the Group VIII of the Periodic Table; and the amount of the 1-mercaptopropionic acid added was 0.3 times of the amount necessary for converting molybdenum and cobalt to $MoS_2$ and CoS, respectively. Catalyst I thus obtained was subjected to the same activity test as that in Example 1, and the result obtained is shown in Table 1 below.

EXAMPLE 10

The same process as in Example 2 was repeated except that 246 g of glyceric acid (as 65 wt.% aqueous solution) was used as a carboxylic acid and 94 g of mercapto-succinic acid was as an organic sulfur compound, and catalyst J was obtained. Regarding the metal content in the catalyst J, the content of molybdenum was 22% by weight as $MoO_3$, that of cobalt was 4% by weight as CoO, and that of phosphorus was 3% by weight as $P_2O_5$. The amount of the glyceric acid added was 1.3 molar times of the total molar amount of the metals of the Group VI and the Group VIII of the Periodic Table; and the amount of the mercapto-succinic acid added was 0.3 times of the amount necessary for converting molybdenum and cobalt to $MoS_2$ and CoS, respectively. Catalyst J thus obtained was subjected to the same activity test as that in Example 1, and the result obtained is shown in Table 1 below.

COMPARATIVE EXAMPLE 1

The same process as in Example 2 was repeated except that 170 g of citric acid was used as a carboxylic acid and no organic sulfur compound was used, and catalyst K was obtained. Regarding the metal content in the catalyst K, the content of molybdenum was 22% by weight as $MoO_3$, that of cobalt was 4% by weight as CoO, and that of phosphorus was 3% by weight as $P_2O_5$. The amount of the citric acid added was 0.7 molar times of the total molar amount of the metals of the Group VI and the Group VIII of the Periodic Table. Catalyst K thus obtained was subjected to the same activity test as that in Example 1, and the result obtained is shown in Table 1 below.

COMPARATIVE EXAMPLE 2

The same process as in Comparative Example 1 was repeated except that 213 g of tartaric acid was used as a carboxylic acid, and catalyst L was obtained. Regarding the metal content in the catalyst L, the content of molybdenum was 22% by weight as $MoO_3$, that of cobalt was 4% by weight as CoO, and that of phosphorus was 3% by weight as $P_2O_5$. The amount of the tartaric acid added was 1.3 molar times of the total molar amount of the metals of the Group VI and the Group VIII of the Periodic Table. Catalyst L thus obtained was subjected to the same activity test as that in Example 1, and the result obtained is shown in Table 1 below.

TABLE 1

| Catalyst | Relative Reaction Rate Constant |
| --- | --- |
| A | 165 |
| B | 148 |
| C | 162 |
| D | 168 |
| E | 153 |
| F | 153 |
| G | 134 |
| H | 130 |
| I | 163 |
| J | 157 |
| K | 100 |
| L | 103 |

In accordance with the method of the present invention, as mentioned above, active metals of the Group VI and the Group VIII of the Periodic Table optionally along with phosphorus, a determined amount of particular carboxylic acid(s) and a determined amount of particular organic sulfur compound(s) are added to a material substance consisting essentially of at least one of inorganic acids and their hydrates, they are kneaded and then shaped, and the shaped pellets are dried at 200° C. or lower to obtain a hydrotreating catalyst. The catalyst thus obtained has a high activity capable of highly efficiently hydrotreating hydrocarbon oil for desulfurization and denitrogenation. Using the catalyst, hydrotreatment of hydrocarbon oil may well be effected under a milder operation condition than the case of using conventional hydrotreating catalysts. The method of the present invention may easily and simply give the hydrotreating catalyst and the industrial advantage of the invention is remarkable.

While the invention has been described in detail and with reference to specific embodiments thereof, it will be apparent to one skilled in the art that various changes and modifications can be made therein without departing from the spirit and scope thereof.

What is claimed is:

1. A method of preparing a hydrotreating catalyst for hydrocarbon oil, in which metals of the Group VI and the Group VIII of the Periodic Table, from 0.3 to 3.5 molar times, of the total molar amount of the metals of the Group VI and the Group VIII of the Periodic Table, of at least one carboxylic acid selected from the group consisting of glycolic acid, lactic acid, tartaric acid, malic acid, citric acid, glyceric acid, gluconic acid, methoxy-acetic acid, ethoxy-acetic acid, malonic acid, succinic acid and glyoxylic, and 0.1 times or more, of the amount necessary for making the metals of the Group VI and the Group VIII of the Periodic Table to their sulfides, of at least one organic sulfur compound selected from the group consisting of mercapto-acetic acid, 1-mercapto-propionic acid, 2-mercaptopropionic acid, 2,3-dimercapto-succinic acid, mercaptosuccinic acid, thio-acetic acid, thio-diglycolic acid, dithio-diglycolic acid, thio-salicylic acid, mercaptoethanol, $\beta$-thiodiglycol and thiourea are added to a material substance consisting essentially of at least one of inorganic oxides and their hydrates, and they are kneaded, shaped and then dried at a temperature of 200° C. or lower.

2. The method as claimed in claim 1, in which the metal of the Group VI of the Periodic Table is at least one of molybdenum and tungsten, and the metal of the Group VIII of the same is at least one of cobalt and nickel.

3. The method as claimed in claim 1, in which the inorganic oxide is at least one of alumina, silica, titania and zirconia.

4. The method as claimed in claim 1, in which the amount of the organic sulfur compound(s) to be added is from 0.1 to 0.5 times of the amount necessary for converting the metals of the Group VI and the Group VIII of the Periodic Table into their sulfides.

5. A method of preparing a hydrotreating catalyst for hydrocarbon oil, in which metals of the Group VI and the Group VIII of the Periodic Table, from 0.1 to 8% by weight, as $P_2O_5$, of phosphorus, from 0.3 to 3.5 molar times, of the total molar amount of the metals of the Group VI and the Group VIII of the Periodic Table, of at least one carboxylic acid selected from the group consisting of glycolic acid, lactic acid, tartaric acid, malic acid, citric acid, glyceric acid, gluconic acid, methoxy-acetic acid, ethoxy-acetic acid, malonic acid, succinic acid and glyoxylic, and 0.1 times or more, of the amount necessary for making the metals of the Group VI and the Group VIII of the Feriodic Table to their sulfides, of at least one organic sulfur compound selected from the group consisting of mercapto-acetic acid, 1-mercapto-propionnic acid, 2-mercapto-propionic acid, 2,3-dimercapto-succinic acid, mercapto-succinic acid, thio-acetic acid, thio-diglycolic acid, dithio-diglycolic acid, thiosalicylic acid, mercaptoethanol, $\beta$-thiodiglycol and thiourea are added to a material substance consisting essentially of at least one of inorganic oxides and their hydrates, and they are kneaded, shaped and then dried at a temperature of 200° C. or lower.

6. The method as claimed in claim 5, in which the metal of the Group VI of the Periodic Table is at least one of molybdenum and tungsten, and the metal of the Group VIII of the same is at least one of cobalt and nickel.

7. The method as claimed in claim 5, in which the inorganic oxide is at least one of alumina, silica, titania and zirconia.

8. The method as claimed in claim 5, in which the amount of the organic sulfur compound(s) to be added is from 0.1 to 0.5 times of the amount necessary for converting the metals of the Group VI and the Group VIII of the Periodic Table into their sulfides.

9. The method as claimed in claim 5, in which the phosphorus is in the form of metaphosphoric acid, pyrophosphoric acid, orthophosphoric acid or nickel phosphate.

* * * * *